United States Patent [19]

Siepierski

[11] Patent Number: 5,332,261
[45] Date of Patent: Jul. 26, 1994

[54] BUCKLE POSITIONING APPARATUS FOR IMPROVING OCCUPANT ACCESS IN A MOTOR VEHICLE

[75] Inventor: Michael A. Siepierski, Birmingham, Mich.

[73] Assignee: General Motors Corporation, Detroit, Mich.

[21] Appl. No.: 14,918

[22] Filed: Feb. 8, 1993

[51] Int. Cl.$^5$ .............................................. B60R 22/00
[52] U.S. Cl. .................................. 280/801.1; 297/481
[58] Field of Search .................. 280/801 R; 297/481, 297/468

[56] References Cited

U.S. PATENT DOCUMENTS

| | | | |
|---|---|---|---|
| 3,227,488 | 1/1966 | Kosbab et al. | 297/330 |
| 3,279,851 | 10/1966 | Hinchcliff | 297/385 |
| 3,295,862 | 1/1967 | Ebert | 280/150 |
| 4,133,556 | 1/1979 | Glinski | 280/744 |
| 4,979,773 | 12/1990 | Eubank | 297/468 X |

FOREIGN PATENT DOCUMENTS

| | | | |
|---|---|---|---|
| 0085745 | 4/1987 | Japan | 280/801 |
| 0095953 | 4/1990 | Japan | 280/801 |

*Primary Examiner*—Margaret A. Focarino
*Assistant Examiner*—Victor E. Johnson
*Attorney, Agent, or Firm*—Todd L. Moore

[57] ABSTRACT

A buckle positioning apparatus in a seat belt system of a motor vehicle for positioning a buckle at a heightened position above a seat bottom for enhancing occupant accessibility of the buckle. The buckle has a lever that is poised for engagement by a back side of a seat back so that the buckle rises and descends with the seat back while not interfering with the movement of the seat back and seat bottom between a cargo position and a normal seating position. The buckle yields to a torsional spring upon an occupant pushing the heightened seat belt buckle upon the occupant entering and exiting the vehicle.

3 Claims, 5 Drawing Sheets

BUCKLE POSITIONING APPARATUS FOR IMPROVING OCCUPANT ACCESS IN A MOTOR VEHICLE

The present invention relates to seat belt systems and more particularly to a buckle positioning apparatus that provides for a heightened position of a buckle relative to a seat bottom for improving passenger access to the buckle without interfering with the movement of the seat.

BACKGROUND OF THE INVENTION

Generally, it is well known in motor vehicles to provide a seat belt system that includes a buckle connected to the vehicle floor by a strap extending through a space between a seat back cushion and a seat bottom cushion so that the cushions support the buckle in its normal use position.

It is also known for some vehicles to utilize a clam shell seat arrangement in which the rear seat is mounted to the vehicle floor by a mechanism comprising of pivots and linkage arms which allow the seat back to fold downward to a horizontal cargo position to form a cargo floor. In some vehicle arrangements, the seat back may also move simultaneously forward with the seat bottom away from the buckle and its connecting strap.

The use of a substantially stiff connecting strap for the buckle, such as a metal bracket or a length of belt supported by a stiff plastic sheath, can support the buckle in its use position even after the seat back and seat bottom have moved away from the buckle. However, in some seating arrangements, the stiff connecting strap and buckle interfere with the movement of the seat back and seat bottom when moving between the cargo position and the normal seating position. Also, the stiff connecting strap and buckle may cause an occupant discomfort upon entering and exiting the vehicle, especially when the buckle is positioned substantially above the seat bottom to facilitate passenger access to the buckle.

Accordingly, the prior art has recognized that the buckle can be connected to the floor by a spring supported yieldable support that continuously biases the buckle into engagement with the seat back so that the buckle always follows the movement of the seat back. However, when utilized in conjunction with a clam shell seat arrangement, the buckle becomes disengaged from the seat back upon the seat back moving away from the buckle towards the cargo position. This results in the buckle being behind the seat back upon the seat returning to its normal seating position, and thus the buckle is unable to obtain the use position.

It would be advantageous to provide a new and improved buckle positioning apparatus for use in conjunction with seating arrangements in which the seat moves substantially away from support of the buckle.

It would also be advantageous to provide such a buckle positioning apparatus that would reliably position the buckle during the return movement of the seat back from the cargo position to the normal seating position so that the buckle is re-established in the occupant accessible use position extending between the seat bottom and the seat back.

In addition, it would be advantageous to provide such a buckle positioning apparatus that would position the buckle at a heightened position above the seat bottom to enhance occupant accessibility to the buckle.

Furthermore, it would be advantageous to provide such a buckle positioning apparatus that would yield during movement of the seat between the normal seating position and the cargo position so that the buckle and support strap would not interfere with the movement of the seat.

Lastly, it would be advantageous for such a buckle positioning apparatus to yieldably support the buckle at its normal use position in order to improve occupant comfort by allowing the buckle to yield and move upon the occupant pushing the buckle.

SUMMARY OF THE INVENTION

The present invention is a buckle positioning apparatus that places a buckle at a heightened position relative to a seat bottom in a normal seating position to enhance occupant accessibility to the buckle. The buckle also avoids interference with a seat back and the seat bottom upon the seat back and seat bottom moving between the normal seating position and a cargo position. The buckle positioning apparatus has the buckle rise and descend with the seat back so that the buckle does not interfere with the seat upon moving between the normal seating position and the cargo position. The present invention also has the buckle yield to a torsional spring upon an occupant pushing the buckle when entering and exiting the vehicle.

In the preferred form, a buckle positioning apparatus positions a seat belt buckle at a heightened position above a seat bottom cushion. An anchor bracket is secured to a floor of a vehicle while also being pivotally connected to both a lever and a buckle bracket at a common horizontal axis. The buckle is connected to and extends from the buckle bracket. The lever is biased to a stowed position and pivotally yields to a back side of a seat back upon the seat back engaging the lever when moving between a cargo position and a normal seating position. The buckle bracket is biased to a use position by a torsional spring that yields upon an occupant pushing the buckle when entering and exiting the vehicle. The yielding of the buckle is utilized to prevent any discomfort which may occur from the occupant sitting on or coming in contact with the buckle.

To this end, the objects of the present invention are to provide a new and improved buckle positioning apparatus that provides a heightened positioning of a seat belt buckle relative to a seat bottom for enhanced occupant accessibility to the buckle, while also not interfering with the seat upon the seat moving between a cargo position and a normal seating position; and to provide a new and improved buckle positioning apparatus that reduces passenger discomfort caused by a heightened buckle upon an occupant entering or exiting the vehicle.

DESCRIPTION OF THE PREFERRED EMBODIMENTS

Figure 1:
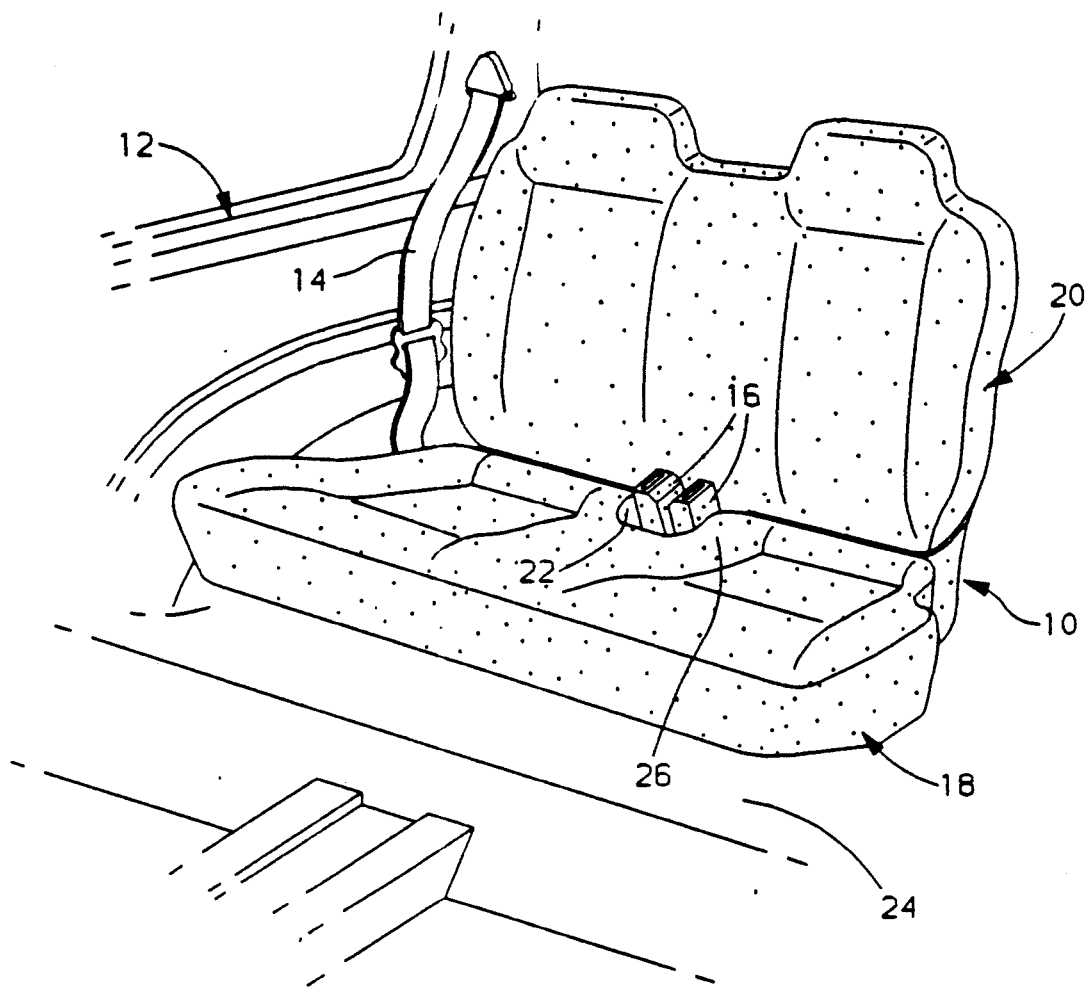
FIG. 1 is a perspective view of the present invention being utilized with a conventional rear bench seat of a vehicle.

Referring to the drawings, the present invention will now be described in detail with reference to the preferred embodiment.

FIG. 1 shows the present invention being utilized with a conventional rear bench seat (10) of a vehicle (12). A conventional seat belt (14) is anchored to the vehicle (12), and the seat belt (14) engages a conventional seat belt buckle (16). The rear bench seat (10) is comprised of a seat bottom cushion (18) and a seat back cushion (20), and the seat bottom (18) has a slot or an opening (22) for the buckle (16) to extend upward from a floor (24) of the vehicle (12). The buckle (16) rises above a top surface (26) of the seat bottom (18) to enhance an occupant's accessibility to the buckle (16).

Figure 2:
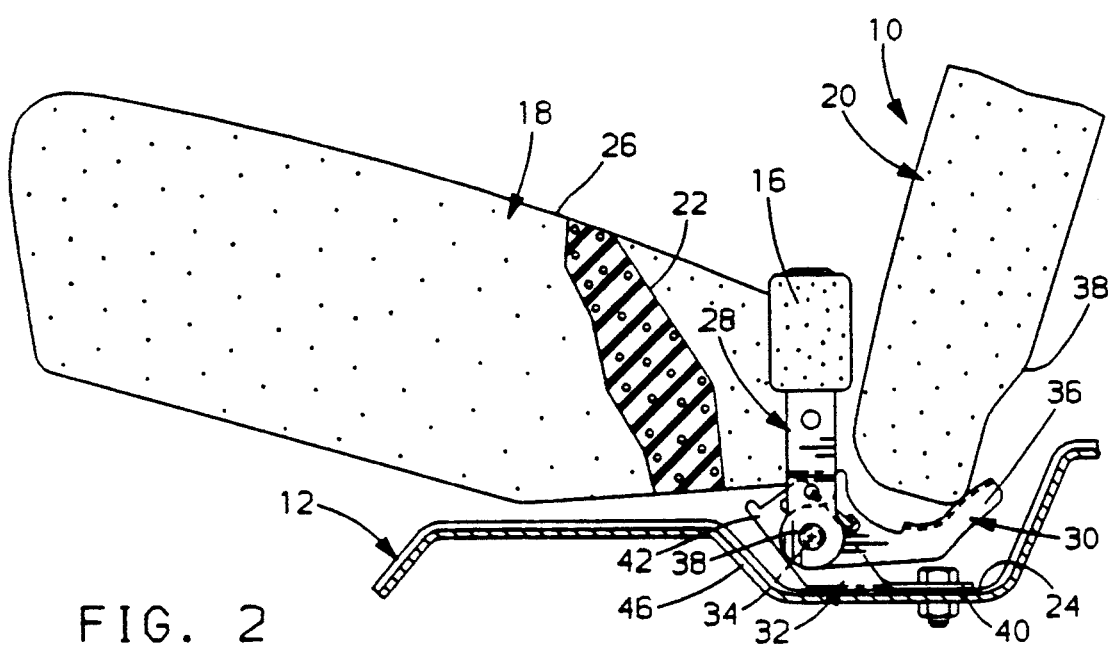
FIG. 2 is a side view of the seat of FIG. 1 with some parts partially cutaway showing the seat back engaging the lever in the normal seating position and showing the buckle in the use position.

As seen in FIG. 2, the buckle (16) is connected to a buckle bracket (28) which in turn is pivotally connected to both a lever (30) and an anchor bracket (32) at a common horizontal axis (34). The anchor bracket (32) is bolted to the floor (24) of the vehicle (12), and the lever (30) has an extending portion or extension (36) which is engaged by a back side (38) of the seat back (20). The seat back (20) and the seat bottom (18) are shown in a normal seating position, wherein the seat back (20) is substantially perpendicular to the seat bottom (18). The seat back (20) is shown engaging the extension (36) of the lever (30) to establish an occupant accessible use position of the buckle (16). Both the lever (30) and the buckle bracket (28) pivot about the common horizontal axis (34), and the anchor bracket (32) remains stationary.

Figure 3:
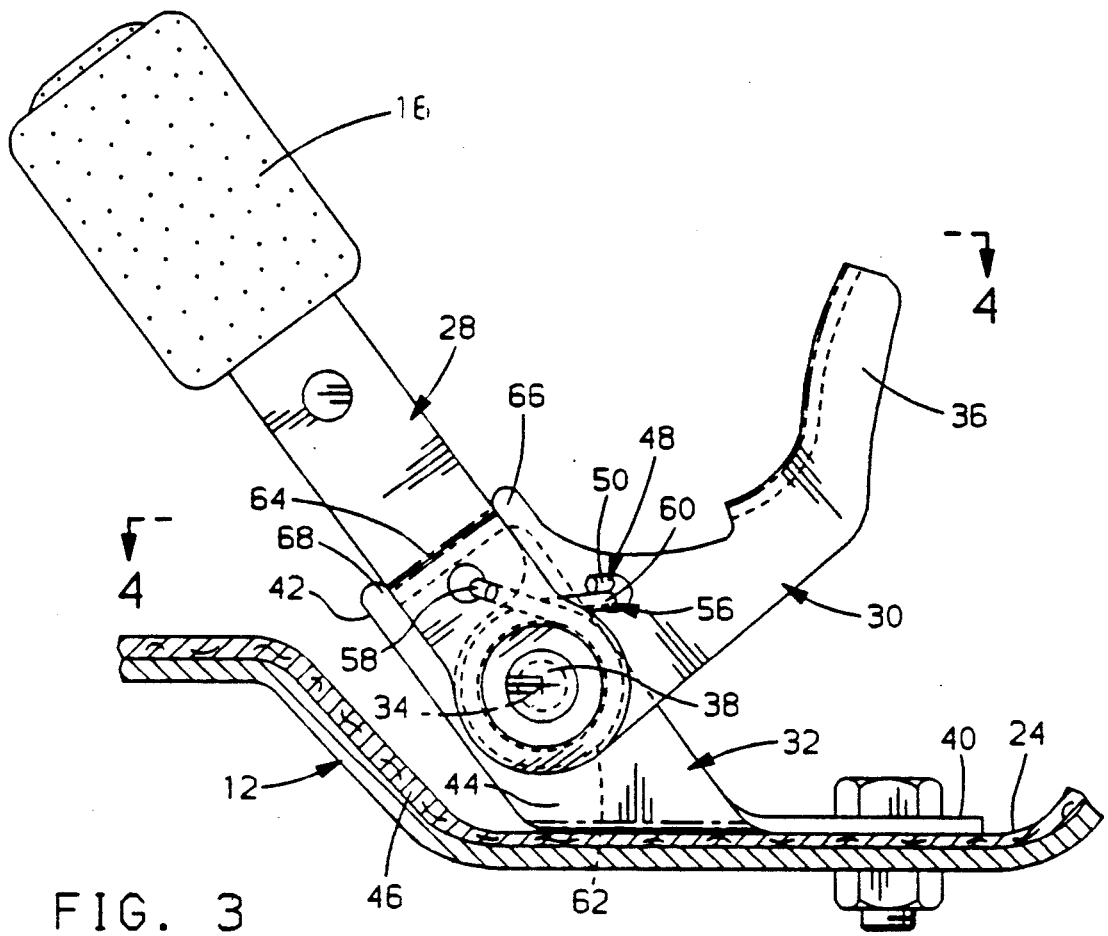
FIG. 3 is an enlarged side view of the buckle positioning apparatus in the stowed position.
Figure 4:
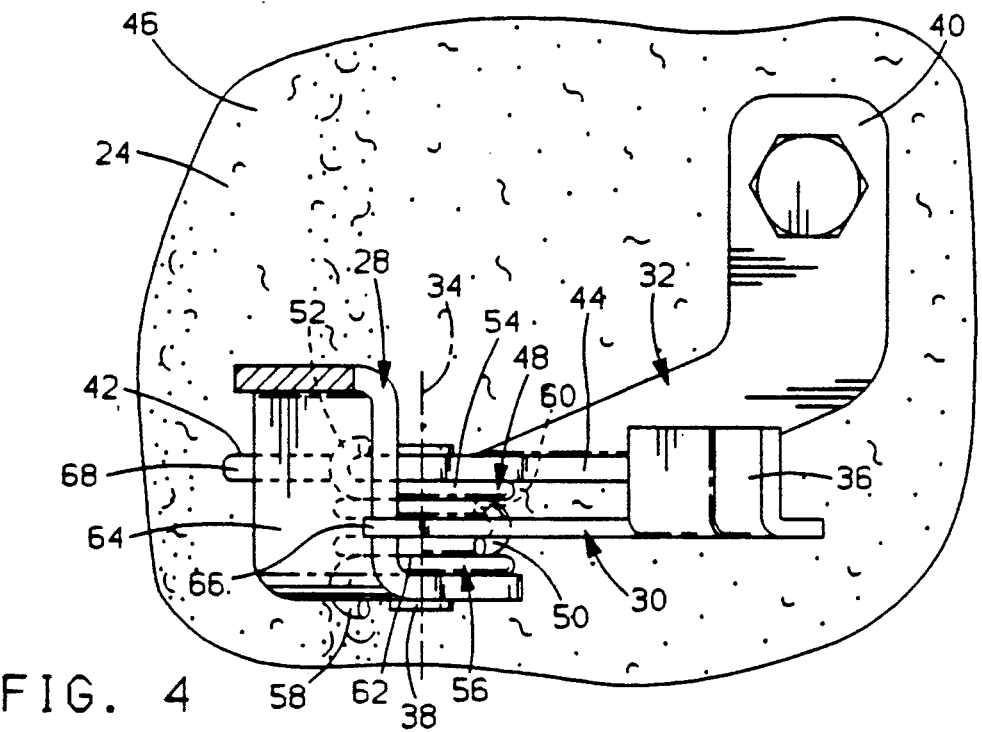
FIG. 4 is a section view taken in the direction of arrows 4—4 of FIG. 3 of the buckle positioning apparatus in the stowed cargo position.

As seen in FIGS. 3 and 4, the anchor bracket (32), lever (30) and buckle bracket (28) are all three pivotally connected through a common horizontal axis (34). The lever (30) lies between the anchor bracket (32) and the buckle bracket (28) at the pivotal axis (34). The lever (30), buckle bracket (28) and anchor bracket (32) each have a hole (not shown) extending therethrough that are in common alignment. A rivet (38) is inserted through the commonly aligned holes to provide the common pivotal connection.

The anchor bracket (32) has a connecting end (40) and a free end (42) with an intermediate portion (44) extending between the two ends (40), (42). The connecting end (40) of the anchor bracket (32) is substantially parallel and bolted to the floor (24) of the vehicle. The intermediate portion (44) of the anchor bracket (32) bends upward from the connecting end (40) so that the intermediate portion (44) and the free end (42) extend upward from the floor (24). As seen in FIG. 3, the floor (24) has an inclined step (46) that is substantially parallel to the intermediate portion (44) and the free end (42) of the anchor bracket (32).

FIG. 3 shows the buckle (16) and lever (30) in a stowed position. The lever (30) is biased to the stowed position by means of a first torsional spring (48), as seen in FIG. 3 and 4. The first torsional spring (48) has two ends (50), (52), one end (50) connected to the lever (30) and the other end (52) connected to the anchor bracket (32). An intermediate portion (54) of the spring (48) extends between the two ends (50), (52). A substantially circular lip (not shown) extends outward from the intermediate portion (44) of the anchor bracket (32) and abuts the lever (30). The intermediate portion (54) of the first torsional spring (48) is coiled around the circular lip of the anchor bracket (32).

The buckle bracket (28) is biased towards the use position by a second torsional spring (56). The second torsional spring (56) has two ends (58), (60), one end (58) connected to the buckle bracket (28) and the other end (60) connected to the lever (30). An intermediate portion (62) extends between the two ends (58), (60) of the second torsional spring (56). The buckle bracket (28) also has a substantially circular lip (not shown) extending outward and abutting the lever (30). The intermediate portion (62) of the second torsional spring (56) is coiled around the circular lip of the buckle bracket (28).

The buckle bracket (28) has a laterally disposed portion (64) that extends across both the lever (30) and the anchor bracket (32), as seen in FIG. 4. The laterally disposed portion (64) of the buckle bracket (28) is interposed between a finger (66) of the lever (30) and a finger (68) at the free end (42) of the anchor bracket (32). Both fingers (66), (68) provide positive stops to limit the traveling range at which the first torsional spring (48) and the second torsional spring (56) will bias the lever (30) and buckle bracket (28), respectively.

Figure 5:
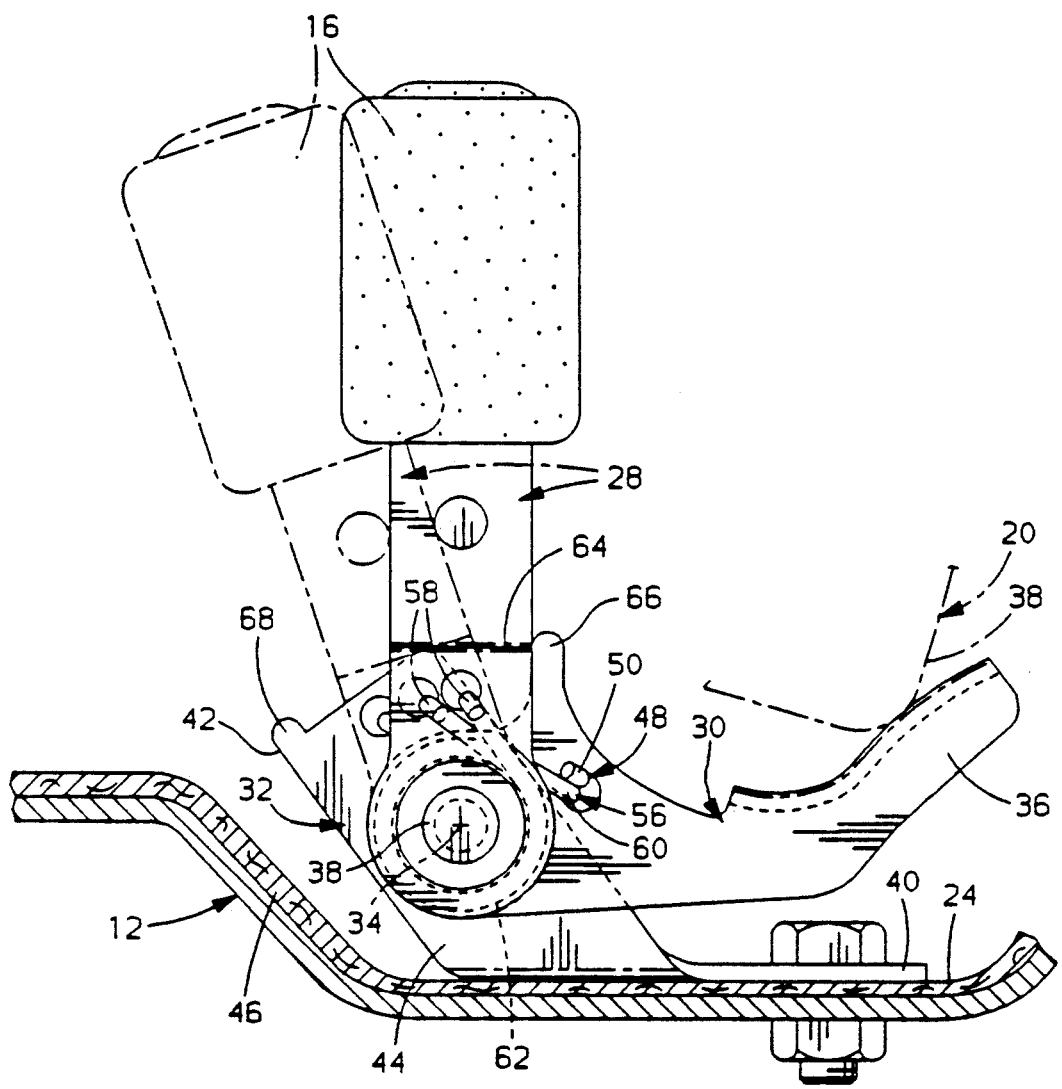
FIG. 5 is an enlarged side view of a buckle positioning apparatus in the use position with the corner of the seat back shown in phantom line and the buckle's position shown in phantom line upon an occupant pushing the buckle.

Since the buckle bracket (28) is biased towards the use position, the laterally disposed portion (64) of the buckle bracket (28) comes in contact with and is positively stopped by the finger (66) of the lever (30), as seen in FIG. 5. When the lever (30) is in the stowed position, the finger (68) of the anchor bracket (32) comes in contact with the laterally disposed portion (64) of the buckle bracket (28) and positively stops the lever (30) and buckle bracket (28) from traveling beyond the stowed position, as seen in FIG. 3. The finger (68) of the anchor bracket (32) extends below the level of the seat back (20) so that the buckle (16) is below the seat back (20) when in the stowed position.

Figure 6:
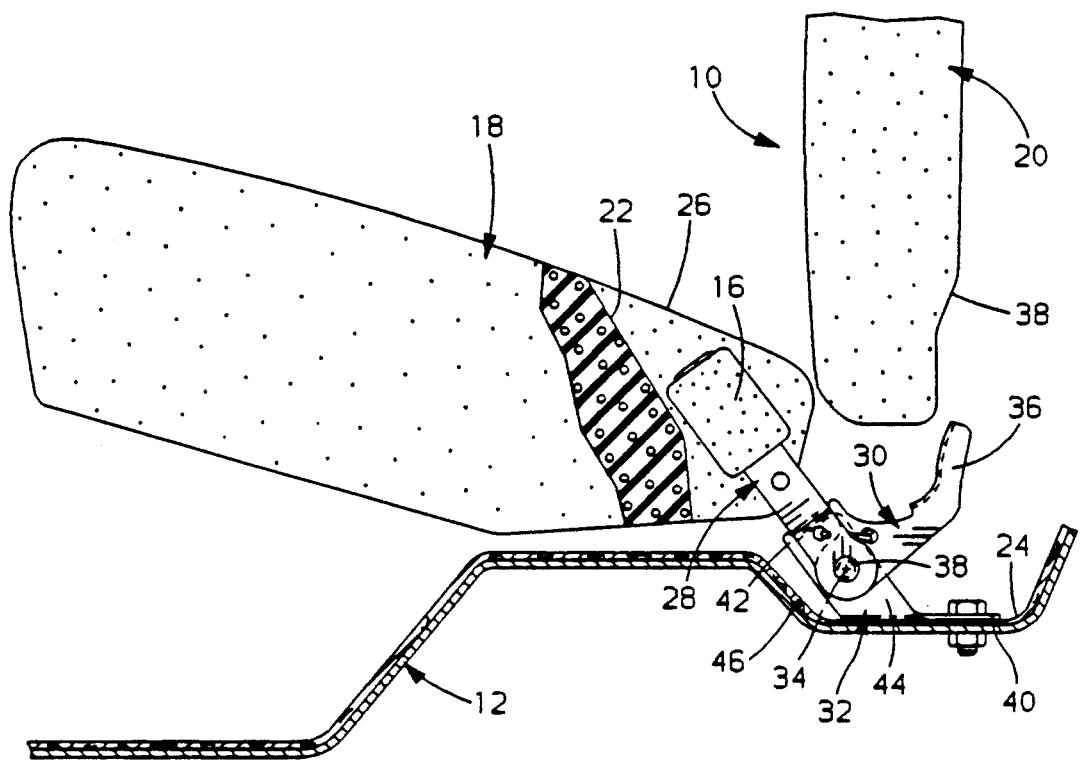
FIG. 6 is a side view and partial cutaway showing a seat between a normal seating position and a cargo position and showing the seat back disengaged from the lever, and the buckle biased in the stowed position.
Figure 7:
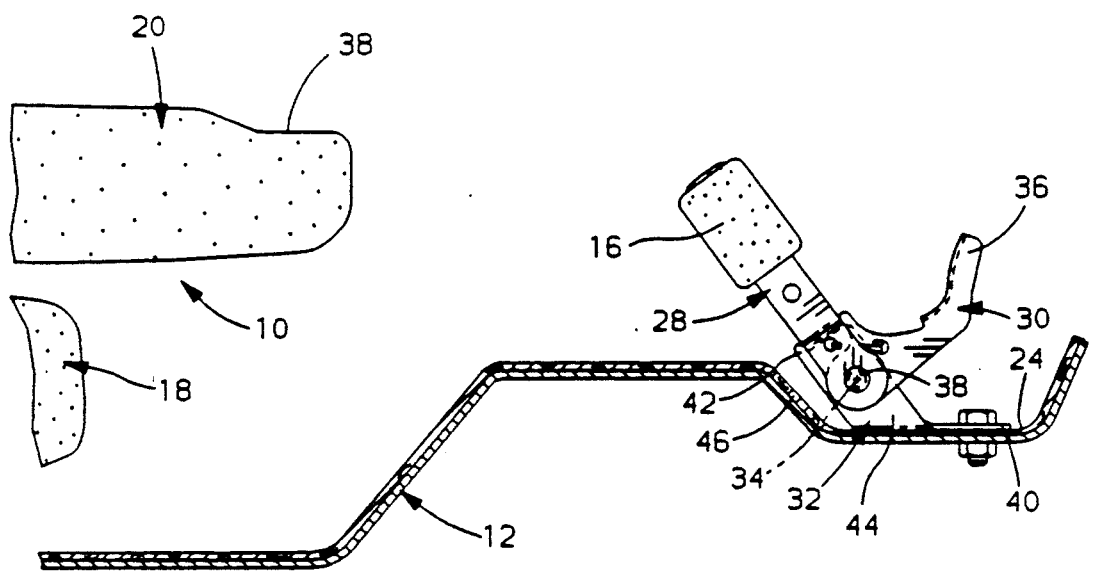
FIG. 7 is a side view showing the seat in a cargo position and showing the seat back disengaged from the lever, and the buckle biased in the stowed position.

As seen in FIG. 6, when the seat back (20) is moved away from the normal seating position, the back side (38) of the seat back (20) is carried away from and then disengages the extension (36) of the lever (30) upon the buckle (16) reaching the stowed position. As previously discussed, the buckle bracket (28) is biased towards the use position, and therefore, the buckle (16) will rise and descend with the lever (30), thus avoiding the buckle (16) interfering with the movement of the seat back (20). Also, as the seat back (20) moves forward, the seat bottom (18) simultaneously moves forward towards the front of the vehicle and avoids contact or interference with the buckle (16), as seen in FIG. 7.

Figure 8:
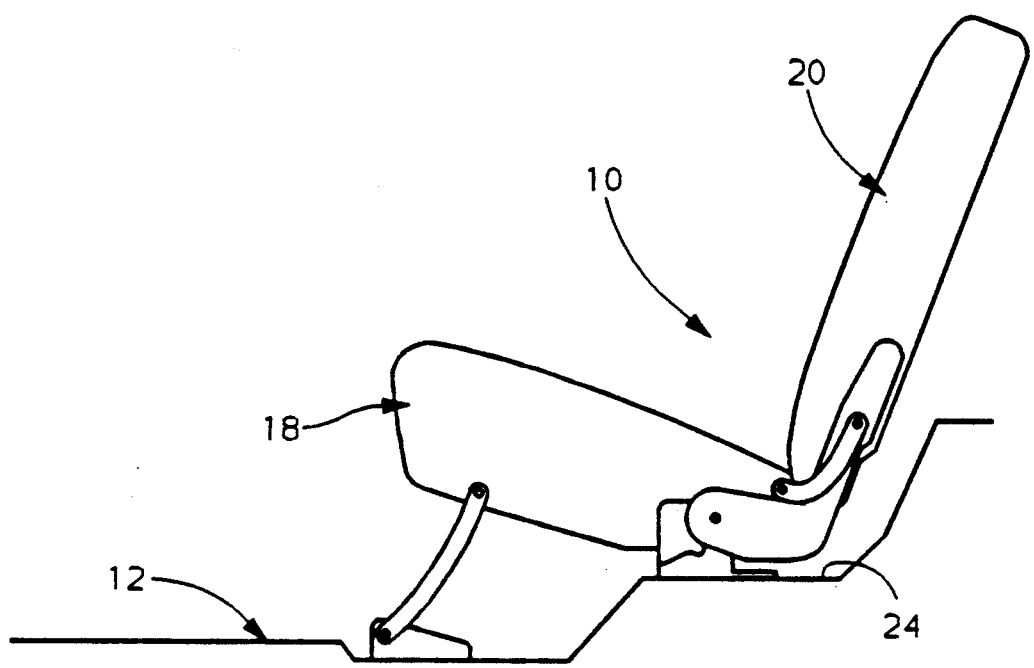
FIG. 8 is a side view of the seat linkage assembly utilized in conjunction with the present invention and shown in the normal seating position.
Figure 9:
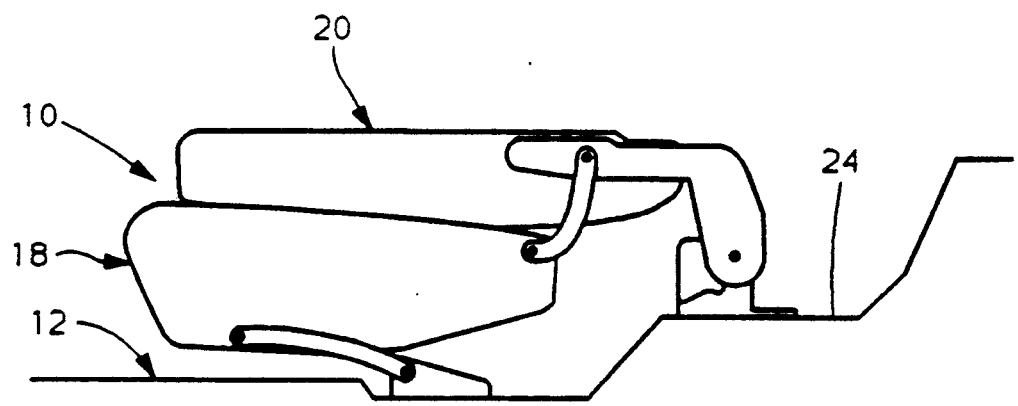
FIG. 9 is a side view of the seat linkage assembly utilized in conjunction with the present invention and shown in the cargo position.

As seen in FIGS. 8 and 9, the bench seat (10) utilizes a conventional clam shell linkage system to simultaneously move the seat bottom (18) and seat back (20) between the normal seating position and a cargo position, wherein the seat back (20) folds onto the seat bottom (18) in a horizontal position. Both the seat back (20) and seat bottom (18) shift forward and downward as the seat (10) moves from the normal seating position to the cargo position.

When an occupant (not shown) pushes the buckle (16) upon entering and exiting the vehicle, the second torsional spring (56) yields to the buckle bracket (28) by having the buckle bracket (28) pivot at the common horizontal axis (34) away from the use position and away from the finger (66) of the lever (30), as seen in phantom line in FIG. 5. This yielding of the second torsional spring (48) prevents occupants from being discomforted by sitting or coming in contact with the buckle (16).

Thus, it is seen that the buckle positioning apparatus places the buckle (16) in a heightened position relative to the seat bottom (18) for enhancing occupant accessibility to the buckle (16), while not having the buckle (16) interfere with the seat (10) upon the seat (10) moving between the normal seating position and the cargo position.

The embodiments of the invention in which an exclusive property or privilege is claimed are defined as follows:

1. A buckle positioning apparatus for improving occupant access to a buckle of a sat belt system in a motor vehicle having a seat bottom and a seat back, and said seat back having a back side, and said seat bottom and said seat back moving between a normal seating position, wherein said seat bottom is substantially perpendicular to said seat back, and a cargo position, wherein said seat back folds onto said seat bottom, and both said seat back and said seat bottom move away from said buckle comprising:
   an anchor bracket connected to said vehicle;
   a buckle pivotally connected to said anchor bracket to permit said buckle to pivot between a stowed position and an occupant accessible use position;
   a lever operatively connected to said buckle and extending into the path of movement of the seat back and poised for engagement with said back side of said seat back only when the seat back moves to the seating position and being disengaged by the seat back when the seat back moves to the cargo position; and
   means for biasing said lever toward a stowed position, and said biasing means yielding to said lever upon said back side of said seat back engaging said lever and pivoting said buckle towards said use position without interfering with the movement of said seat bottom and said seat back between said cargo position and said normal seating position.

2. A buckle positioning apparatus for improving occupant access to a buckle of a seat belt system in a motor vehicle having a seat bottom and a seat back, and said seat back having a back side, and said seat bottom and said seat back moving between a normal seating position, wherein said seat bottom is substantially perpendicular to said seat back, and a cargo position, wherein said seat back folds onto said seat bottom, and both said seat back and said seat bottom move forward in said motor vehicle and away from said buckle comprising:
   an anchor bracket connected to said vehicle;
   said buckle pivotally connected to said anchor bracket to permit said buckle to pivot between a stowed position and an occupant accessible use position;
   a lever pivotally connected to both said anchor bracket and said buckle and poised for engagement with said back side of said seat back upon said seat back moving between said cargo position and said normal seating position;
   a torsional spring having a first end and a second end and having said first end connected to said anchor bracket and said second end connected to said lever to bias said lever toward said stowed position and having said torsional spring yield to said lever upon said back side of said seat back engaging said lever and having said lever pivot and raise said buckle toward said use position without interfering with the movement of said seat bottom and said seat back;
   a positive stop integral with and extending from said anchor bracket and having said buckle abut said positive stop in said stowed position and having said lever abut said buckle in said stowed position preventing said lever from traveling beyond said stowed position; and
   a second means for biasing said buckle toward said use position and having said second biasing means yield to said buckle upon an occupant pushing said buckle.

3. A buckle positioning apparatus for improving occupant access to a buckle in a seat belt system of a motor vehicle having a floor, a seat bottom and a seat back, and said seat back having a back side, and said seat bottom having an opening for extending said buckle through said seat bottom, and said seat bottom being connected to said floor and providing bodily movement between a normal seating position, wherein said seat bottom is substantially perpendicular to said seat back, and a cargo position, wherein said seat back folds onto said seat bottom, and both said seat back and said seat bottom move forward in said vehicle and away from said buckle comprising:
   said seat back being pivotally connected to said floor and linked with said seat bottom for simultaneous bodily movement between said normal seating position and said cargo position;
   an anchor bracket having a first end, a second end and an intermediate portion with said first end connected to said floor, and said intermediate portion and said second end extending upward from said floor;
   a buckle bracket pivotally connected to said anchor bracket;
   a buckle connected to and extending from said buckle bracket and pivoting with said buckle bracket between a stowed position and an occupant accessible use position;
   a lever pivotally connected to both said anchor bracket and said buckle bracket through a common horizontal axis, and said lever being mounted between said anchor bracket and said buckle bracket at said common horizontal axis and having an extension poised for engagement by said back side of said seat back upon said seat back moving between said cargo position and said normal seating position and upon said seat back being engaged in said normal seating position;
a first torsional spring having a first end and a second end with said first end connected to said lever and said second end connected to said buckle bracket and biasing said buckle bracket toward said use position and yielding to said buckle bracket upon an occupant pushing said buckle toward said stowed position upon said lever being engaged by said back side of said seat back;
a first positive stop formed in said lever and having said buckle bracket abut said first positive stop upon said first torsional spring biasing said buckle bracket toward said use position, and said first positive stop preventing said buckle bracket from traveling beyond said lever and said use position;
a second torsional spring having a first end and a second end with said first end connected to said lever and said second end connected to said anchor bracket and biasing said lever toward said stowed position and yielding to said lever upon said back side of said seat back engaging said extension of said lever, and said lever raising said buckle through said opening in said seat bottom toward said use position without interfering with the movement of said seat bottom and said seat back between said cargo position and said normal seating position; and
a second positive stop formed in said second end of said anchor bracket and having said buckle bracket abut against said second positive stop upon said second torsional spring biasing said lever towards said stowed position and having said lever abut against said buckle bracket in said stowed position to prevent said lever from traveling beyond said stowed position.

* * * * *